US010353497B2

(12) United States Patent
Fujimoto et al.

(10) Patent No.: US 10,353,497 B2
(45) Date of Patent: Jul. 16, 2019

(54) SUBSTRATE WITH CONDUCTIVE LAYERS, SUBSTRATE WITH TOUCH-PANEL TRANSPARENT ELECTRODES, AND METHOD FOR FABRICATING SAME

(71) Applicant: Kaneka Corporation, Osaka (JP)

(72) Inventors: Takahisa Fujimoto, Osaka (JP); Hitoshi Tamai, Osaka (JP); Kenji Yamamoto, Osaka (JP)

(73) Assignee: Kaneka Corporation (JP)

( * ) Notice: Subject to any disclaimer, the term of this patent is extended or adjusted under 35 U.S.C. 154(b) by 96 days.

(21) Appl. No.: 15/551,514

(22) PCT Filed: Feb. 18, 2016

(86) PCT No.: PCT/JP2016/054730

§ 371 (c)(1),
(2) Date: Aug. 16, 2017

(87) PCT Pub. No.: WO2016/140073

PCT Pub. Date: Sep. 9, 2016

(65) Prior Publication Data

US 2018/0032167 A1 Feb. 1, 2018

(30) Foreign Application Priority Data

Mar. 4, 2015 (JP) ................................ 2015-042545

(51) Int. Cl.
*G06F 3/041* (2006.01)
*B32B 15/08* (2006.01)
(Continued)

(52) U.S. Cl.
CPC .............. *G06F 3/041* (2013.01); *B32B 15/04* (2013.01); *B32B 15/08* (2013.01); *B32B 15/20* (2013.01);
(Continued)

(58) Field of Classification Search
CPC ......... H01L 21/00; H01L 21/02; H01L 23/00; G02F 1/01; G02F 1/13; G02F 1/1333; G06F 3/41; G06F 3/44
(Continued)

(56) References Cited

U.S. PATENT DOCUMENTS 6,416,194 B1 * 7/2002 Demiryont .............. C03C 17/36 359/359
9,405,046 B2 * 8/2016 Ding .................. C03C 17/3644
(Continued)

FOREIGN PATENT DOCUMENTS

JP H10307204 A 11/1998
JP 2002246788 A 8/2002
(Continued)

OTHER PUBLICATIONS

International Search Report for PCT/JP2016/054730 dated May 17, 2016.

*Primary Examiner* — Xiaoliang Chen
(74) *Attorney, Agent, or Firm* — Lerner, David, Littenberg, Krumholz & Mentlik, LLP

(57) ABSTRACT

The present invention provides a substrate with conductive layers, capable of improving both glare preventing properties and etching characteristics; a method for fabricating the same; and a substrate with touch-panel transparent electrodes. A substrate with conductive layers has, on at least one side of a transparent film substrate, a thin film underlayer, a metal oxide layer, and a first metal layer formed in this order. The thin film underlayer comprises nickel and copper or nickel oxide and copper oxide, the metal oxide layer comprises nickel oxide and copper oxide, and the first metal layer comprises of at least one of gold, silver, and copper. The substrate preferably satisfies the following relational expressions: [1] the thickness of the thin film underlayer is 20 nm or less; [2] the thickness of the metal oxide layer is
(Continued)

80 nm or less; and [3] the thickness of the thin film underlayer is equal to or less than the thickness of the metal oxide layer.

6 Claims, 4 Drawing Sheets

(51) Int. Cl.

| | |
|---|---|
| ***H01B 5/14*** | (2006.01) |
| ***B32B 15/04*** | (2006.01) |
| ***B32B 15/20*** | (2006.01) |
| ***G06F 3/044*** | (2006.01) |
| *H01B 13/00* | (2006.01) |

(52) U.S. Cl.

CPC ............... *G06F 3/044* (2013.01); *H01B 5/14* (2013.01); *B32B 2307/202* (2013.01); *B32B 2307/412* (2013.01); *B32B 2309/105* (2013.01); *B32B 2457/208* (2013.01); *G06F 2203/04103* (2013.01); *G06F 2203/04112* (2013.01); *H01B 13/0036* (2013.01)

(58) Field of Classification Search

USPC ................ 174/255, 256; 428/214, 216, 336; 359/265, 267, 360, 883; 257/43, 79, 762

See application file for complete search history.

(56) References Cited

U.S. PATENT DOCUMENTS

2002/0071934 A1 6/2002 Marutsuka
2005/0248824 A1* 11/2005 Fukazawa ............. G02F 1/1523 359/265
2007/0102192 A1 5/2007 Naito et al.
2011/0240996 A1* 10/2011 Lin ..................... H01L 51/5048 257/43
2012/0038564 A1 2/2012 Kim et al.
2013/0177752 A1* 7/2013 Fujino ...................... H01B 5/14 428/216
2013/0299216 A1 11/2013 Ichiki
2014/0044942 A1* 2/2014 Fujino ..................... G06F 3/044 428/214
2014/0272394 A1* 9/2014 Choi ..................... G02F 1/1533 428/336

FOREIGN PATENT DOCUMENTS

JP 2008311565 A 12/2008
JP 2012508924 A 4/2012
JP 2013129183 A 7/2013
JP 2013186632 A 9/2013
JP 2014160481 A 9/2014
WO 2005060326 A1 6/2005

* cited by examiner

SUBSTRATE WITH CONDUCTIVE LAYERS, SUBSTRATE WITH TOUCH-PANEL TRANSPARENT ELECTRODES, AND METHOD FOR FABRICATING SAME

CROSS-REFERENCE TO RELATED APPLICATION

This application is a national phase entry under 35 U.S.C. § 371 of International Application No. PCT/JP2016/054730, filed on Feb. 18, 2016, published in Japanese, which claims priority to Japanese Patent Application No 2015-042545, filed on Mar. 4, 2015, the disclosures of which are incorporated herein by reference.

TECHNICAL FIELD

The present invention relates to a substrate with conductive layers in which conductive layers are formed on a transparent film substrate, a substrate with touch-panel transparent electrodes, and a method for fabricating same.

BACKGROUND ART

In substrates with transparent electrodes, which are used in display devices such as touch panels and displays, light-emitting devices such as LEDs, and light-receiving devices such as solar cells, control of electrical properties so called sheet resistance is important. A transparent conductive oxide including indium oxide as a main component is often used as a material of such transparent electrodes. The addition of metal oxides such as tin oxide to the indium oxide enables imparting of various properties.

There has been known, as the structure of a common substrate with transparent electrodes, those in which a transparent electrode thin film is formed on a soft substrate such as a film and patterning is carried out. To perform crystallization, transparent conductive oxide such as indium oxide is required to undergo high-temperature deposition or a heat treatment after the deposition, and the temperature is determined by heat resistance of the film substrate and the transparent conductive oxide has poor conductivity as compared with that of metal. Inevitably, it is considered that electrical properties of the transparent electrode using a transparent conductive oxide have limits, for example, $8\times10^{-5}$ to $3\times10^{-4}$ Ωcm.

Meanwhile, there have been developed, as a material for low-resistance transparent electrodes, resins including metal nanowires dispersed therein, metal mesh, and the like, and activities towards the practical application have been intensively promoted. Particularly, as mentioned in Patent Document 1, a mesh-like and translucent (transparent) mesh metal is obtained by using, as metal wiring, a thin wire having a line width of 10 μm or less, especially 5 μm or less.

Patent Document 1: Japanese Unexamined Patent Application, Publication No. 2013-186632

Patent Document 2: Japanese Unexamined Patent Application, Publication No. 2008-311565

Patent Document 3: Japanese Unexamined Patent Application, Publication No. 2002-246788

Patent Document 4: Japanese Unexamined Patent Application, Publication No. H10-307204

DISCLOSURE OF THE INVENTION

Problems to be Solved by the Invention

By the way, a touch panel is disposed on a display surface, so that visibility would be a major problem. Particularly, a metal thin wire pattern is required to improve glare and, when using copper, it is required to improve its brown tint, in addition to glare. In some case, a glare preventive measure may be taken against one surface according to a direction of a film. However, when copper is deposited on both surfaces of one film, it becomes necessary to take a glare preventive measure against an interface between a base material and a metal layer, and the outermost surface of the metal layer. There are disclosed, as conventional technology of preventing glare of a metal layer, technologies of laminating a black metal layer (Patent Documents 2, 3, and 4).

Patent Document 2 is directed to an improvement in visibility of electromagnetic wave shielding, and the function of a thin wire pattern (5 μm or less) required to a touch panel is not effectively activated, so that fabrication of a line width of 5 μm or less is not assumed. In a method of laminating a black metal oxide layer, it is easily assumed that a difference in an etching rate between the black metal oxide layer and the metal wiring portion increases, and there is a problem in thinning of 5 μm or less, thus making it possible to say that it is difficult to directly apply technology of this patent document for the touch panel.

Patent Document 3 discloses an electromagnetic wave shielding in which a black metal oxide layer and a metal layer are laminated in order on a transparent film substrate through a transparent underlayer therebetween. In the case of a touch panel provided with metal mesh electrodes, the touch panel does not include a transparent underlayer which is a transparent conductive layer, and lamination of a transparent inorganic layer for improving adhesion is not preferable in view of costs. An etching rate and an etching time of each layer would be important for thinning of 5 μm or less. Since these respects are not taken into consideration, it is considered that technology of this patent document cannot be applied for a touch panel.

Patent Document 4 discloses a substrate with a light shielding layer in which an oxide layer or a nitride layer of nickel or copper is formed as a first layer of the light shielding layer, and an alloy of nickel and copper, or nitride or carbide thereof is formed as a second layer. Although a film-like transparent conductive layer such as ITO is formed on a color filter layer, the technology of this patent document does not assume side etching caused due to a difference in etching time between a metal layer thinned by etching after lamination and the light shielding layer. Furthermore, only a line width of about 20 μm is disclosed, and it can be said that a thin wire mesh electrode (5 μm in width) for a touch panel is not assumed.

To suppress glare originating from metal gloss, a surface treatment or a glare preventing layer (black layer) is required. Particularly, to form a glare preventing layer with a low etching rate between a transparent film substrate and a metal layer, and to form a thin wire conductive pattern having a line width of 5 μm or less (thin wire mesh electrode) by etching, there is a need to control an etching rate and an etching time of each layer.

In this case, a difference between the etching rate of the black layer and the etching rate of the metal layer is large, and it is a problem to achieve both prevention of glare and etching rate/etching time. When a metal layer is deposited on a conventional black layer, etching properties and glare preventing properties are in a trade-off relationship, and when the amount of metal oxide or the amount of metal nitride of the black layer is increased to enhance glare preventing properties, the etching rate decreases, leading to the occurrence of side etching of the thin wire mesh electrode. When forming a thin wire conductive pattern having a line width 5 μm or less for a touch panel, it is required to satisfy both these properties. An object of the present invention is to provide a substrate with conductive layers, which can improve both glare preventing properties and etching properties, a method for fabricating same, and a substrate with touch-panel transparent electrodes.

Means for Solving the Problems

A substrate with conductive layers of the first invention (claim 1) includes, on at least one surface of a transparent film substrate, a thin film underlayer, a metal oxide layer, and a first metal layer formed in this order, wherein the thin film underlayer contains nickel and copper or oxides thereof as a main component, the metal oxide layer contains oxides of nickel and copper as a main component, and the first metal layer contains at least one of gold, silver, and copper as a main component, and wherein the substrate satisfies the following relational expressions (1) to (3):

(1) the thin film underlayer has a thickness of 20 nm or less, (2) the metal oxide layer has a thickness of 80 nm or less, and (3) a thickness of the thin film underlayer a thickness of the metal oxide layer.

The first invention can employ the following various forms.

(a) The following relational expression is satisfied: a ratio of O/(Ni+Cu) at a position of ½ of a thickness of the thin film underlayer a ratio of O/(Ni+Cu) at a position of ½ of a thickness of the metal oxide layer.

(b) On the first metal layer, a second metal layer containing any one of gold, silver, and copper as a main component is further laminated.

(c) The following relational expression is satisfied: a ratio of O/(Ni+Cu) at a position of ¼ of a thickness from a surface of the metal oxide layer<a ratio of O/(Ni+Cu) at a position of 9/10 of a thickness from a surface of the metal oxide layer.

(d) The following relational expression is satisfied: a ratio of O/(Ni+Cu) at a position of 9/10 of a thickness from an interface between the thin film underlayer and the metal oxide layer<a ratio of O/(Ni+Cu) at a position of 9/10 of a thickness from a surface of the metal oxide layer.

(e) The first metal layer has a thickness of 10 nm or more and 500 nm or less and the second metal layer has a thickness of 100 nm or more and 10 μm or less, and the total of the thickness of the thin film underlayer, the thickness of the metal oxide layer, the thickness of the first metal layer, and the thickness of the second metal layer is 10 μm or less.

A substrate with touch-panel transparent electrodes of the second invention is characterized in that first and second metal layers in the substrate with conductive layers according to (b) mentioned above are formed into a thin wire mesh electrode which has a line width of 1 to 10 μm reduced by thinning and has an opening ratio of 90% or more.

A method for fabricating a substrate with conductive layers of the third invention is a method for fabricating a substrate with conductive layers by forming, on at least one surface of a transparent film substrate, a thin film underlayer, a metal oxide layer, and a first metal layer in this order, the method comprising: a thin film underlayer formation step of forming the thin film underlayer which contains nickel and copper or oxides thereof as a main component, and has a thickness of 20 nm or less; a blackened layer formation step of forming the metal oxide layer which contains oxides of nickel and copper as a main component, and has a thickness of 80 nm or less; and a metal layer formation step of forming, on the metal oxide layer, a first metal layer containing at least one of gold, silver, and copper as a main component.

This invention of the method for fabricating a substrate with conductive layers may employ the following steps.

(f) The method may further comprise a metal layer lamination step of forming, on the first metal layer, a second metal layer containing any one of gold, silver, and copper as a main component.

(g) The value calculated from oxygen flow rate/power density when laminating the thin film underlayer and the metal oxide layer by sputtering of the thin film underlayer is smaller than that of the metal oxide layer.

(h) The value calculated from the oxygen flow rate/power density is 0 or more and 14 or less for the thin film underlayer, while the value is 9 or more and 27 or less for the metal oxide layer.

(i) A pressure by sputtering during deposition is 0.6 Pa or less.

The method for fabricating a substrate with conductive layers of the fourth invention is a method for fabricating a substrate with conductive layers according to (b) mentioned above, wherein, in the metal layer formation step, the first metal layer is formed by sputtering, while in the metal layer laminating step, the second metal layer is formed by electroplating. A method for fabricating a substrate with touch-panel transparent electrode of the fifth invention includes an electrode formation step of forming a thin film underlayer, a metal oxide layer, and a first metal layer in the substrate with conductive layers fabricated by the method for fabricating a substrate with conductive layers according to the third invention into a thin wire mesh electrode having a line width of 1 to 10 μm reduced by thinning. A method for fabricating a substrate with touch-panel transparent electrodes of the sixth invention includes an electrode formation step of forming a thin film underlayer, a metal oxide layer, a first metal layer, and a second metal layer in the substrate with conductive layers fabricated by the method for fabricating a substrate with conductive layers according to (f) mentioned above into a thin wire mesh electrode having a line width of 1 to 10 μm reduced by thinning.

Effects of the Invention

According to the substrate with conductive layers of the first invention, a thin film underlayer containing nickel and copper or oxides thereof as a main component is laminated as a film (20 nm or less in thickness) having a transparent or semitransparent glare preventing function, and a metal oxide layer containing oxides of nickel and copper as a main component is laminated thereon as a film (80 nm or less in thickness) having a transparent or semitransparent glare preventing function. Whereby, the thin film underlayer and the metal oxide layer enable double suppression of glare of the first metal layer. As mentioned above, due to double suppression of glare of the metal layer, it is possible to improve etching properties of the thin film underlayer and the metal oxide layer as compared with the case where the thin film underlayer is not formed. As a result, it is possible to simultaneously satisfy an improvement in etching properties and an improvement in glare preventing effect, thus enabling fabrication of those which satisfy both properties which have been in a trade-off relationship.

According to the substrate with touch-panel transparent electrodes of the second invention, a thin film underlayer, a metal thin film layer, a first metal thin film layer, and a second metal layer are laminated in this order on a transparent film substrate, and the first and second metal layers are formed into a metal mesh electrode having a width of 1 to 10 μm by patterning, thus making it possible to provide a glare-prevented substrate with touch-panel transparent electrodes, including metal mesh electrodes.

According to the method for fabricating a substrate with conductive layers of the third invention, a thin film underlayer and a metal oxide layer are laminated by sputtering, thus making it possible to form a thin film underlayer and a metal oxide layer each having stable quality. According to the method for fabricating a substrate with conductive layers of the fourth invention, a first metal layer is formed by sputtering and a second metal layer is laminated by electroplating, thus making it possible to form a second metal layer having stable quality in a larger thickness than that of a first metal layer. According to the method for fabricating a substrate with touch-panel transparent electrodes of the fifth invention, it is possible to form a thin film underlayer laminated by sputtering, a metal oxide layer, and a first metal layer into a thin wire mesh electrode having a line width of 1 to 10 μm by etching. According to the method for fabricating a substrate with touch-panel transparent electrodes of the sixth invention, it is possible to form a thin film underlayer laminated by sputtering, a metal oxide layer, a first metal layer, and a second metal layer into a thin wire mesh electrode having a line width of 1 to 10 μm by etching.

BRIEF DESCRIPTION OF THE DRAWINGS

FIG. 1 is an explanatory diagram of each method for fabricating a substrate with conductive layers and a substrate with touch-panel transparent electrodes according to the embodiment of the present invention, in which

FIG. 2 is an explanatory diagram of each method for fabricating a substrate with conductive layers and a substrate with touch-panel transparent electrodes according to the embodiment of the present invention, in which

PREFERRED MODE FOR CARRYING OUT THE INVENTION

Figure 1A:
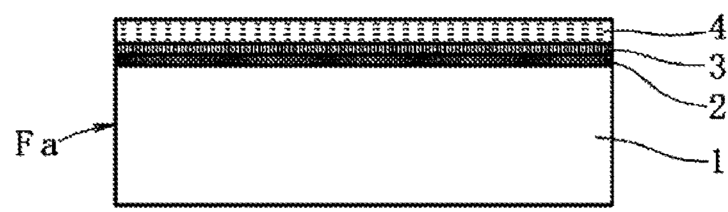
FIG. 1(A) is a cross-sectional view showing a substrate with conductive layers, including a thin film underlayer, a metal oxide layer, and a metal layer laminated on a transparent film substrate.
Figure 1B:
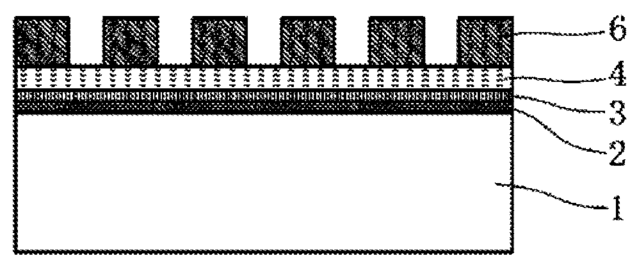
FIG. 1(B) is a cross-sectional view showing a state under fabrication where a resist was patterned thereon.
Figure 1C:
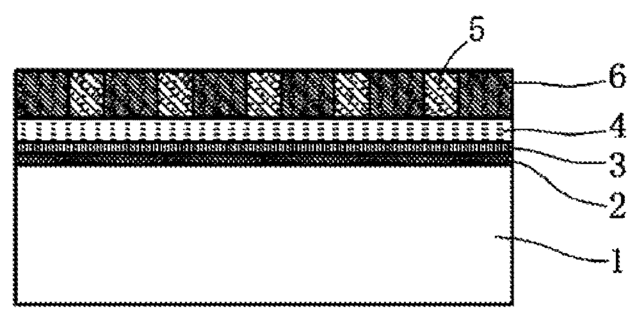
FIG. 1(C) is a cross-sectional view showing a state under fabrication where electroplating was further applied.
Figure 1D:
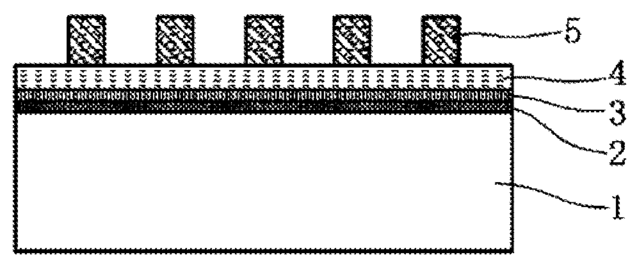
FIG. 1(D) is a cross-sectional view showing a state under fabrication when the resist was removed.
Figure 1E:
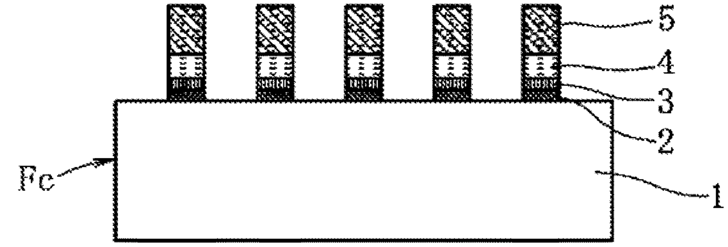
FIG. 1(E) is a cross-sectional view showing a substrate with touch-panel transparent electrodes on which thin wire mesh electrodes were formed by etching.
Figure 2A:
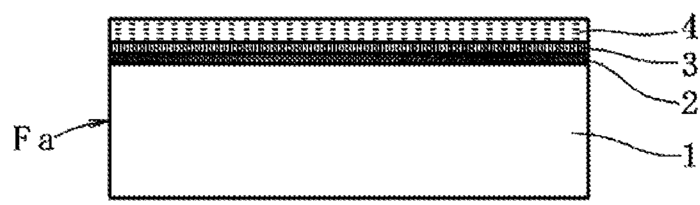
FIG. 2(A) is a cross-sectional view showing a substrate with conductive layers, including a thin film underlayer, a metal oxide layer, and a metal layer laminated on a transparent film substrate.
Figure 2B:
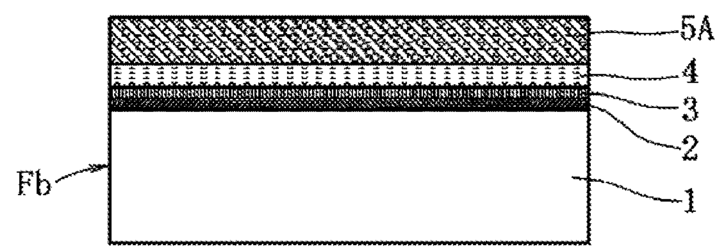
FIG. 2(B) is a cross-sectional view showing a substrate with conductive layers, including a thin film-like metal layer laminated thereon.
Figure 2C:
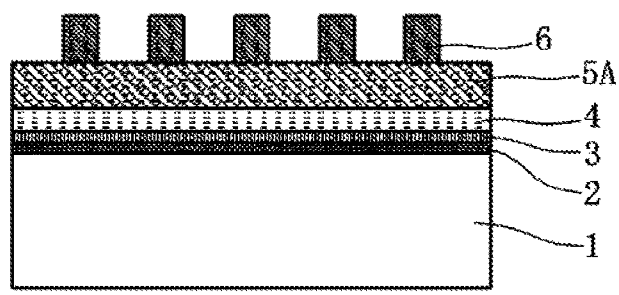
FIG. 2(C) is a cross-sectional view showing a state under fabrication where a resist was patterned on the substrate with conductive layers.
Figure 2D:
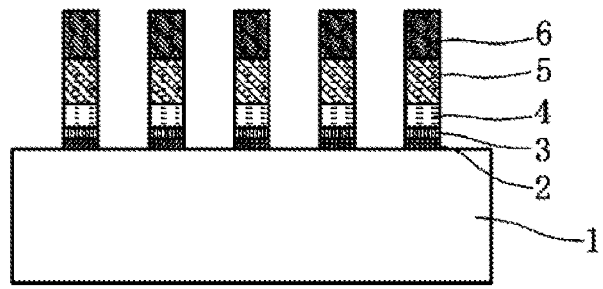
FIG. 2(D) is a cross-sectional view showing a state under fabrication where etching was performed to form a thin wire mesh electrode.
Figure 2E:
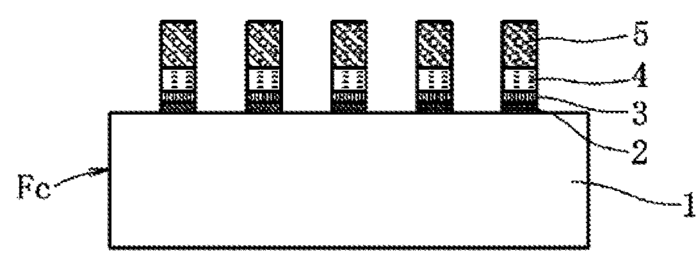
FIG. 2(E) is a cross-sectional view showing a substrate with touch-panel transparent electrodes completed by removing the resist.

Mode for carrying out the present invention will be described with reference to the accompanying drawings.

Embodiments

In FIG. 1 and FIG. 2, a substrate with conductive layers, a substrate with touch-panel transparent electrodes, and method for fabricating same according to the embodiments of the present invention are shown.

[Structures of Substrate with Conductive Layers, and Substrate with Touch-Panel Transparent Electrodes]

A substrate Fa with conductive layers shown in FIG. 1 is that in which a thin film underlayer 2, a metal oxide layer 3, and a metal layer 4 (first metal layer) are laminated in this order on a transparent film substrate 1. A substrate Fc with touch-panel transparent electrodes shown in FIG. 1 is that in which, after forming a thin wire mesh-shaped metal layer 5 (second metal layer) on a surface of the substrate Fa with conductive layers, the thin film underlayer 2, the metal oxide layer 3, and the metal layer 4 are etched, and thus a thin wire mesh electrode is formed of the thin film underlayer 2, the metal oxide layer 3, the metal layer 4, and the metal layer 5.

A substrate Fb with conductive layers shown in FIG. 2 is that in which a thin film-like metal layer 5A (second metal layer) is formed on a surface of the same substrate Fa with conductive layers mentioned above by electroplating. A substrate Fc with touch-panel transparent electrodes shown in FIG. 2 is that in which a thin film underlayer 2, a metal oxide layer 3, a metal layer 4, and a thin film-like metal layer 5A of the substrate Fb with conductive layers are etched to form a thin wire mesh electrode including a metal layer 5.

[Transparent Film Substrate 1]

The material of a transparent film constituting the transparent film substrate 1 is not particularly limited as long as it is colorless and transparent in at least visible light range, and has heat resistance at a transparent electrode layer formation temperature. Examples of the material of the transparent film include polyester-based resins such as polyethylene terephthalate (PET), polybutylene terephthalate (PBT), and polyethylene naphthalate (PEN), cycloolefin-based resins, polycarbonate resin, polyimide resins, cellulose resins, and the like. Of these, polyester resins are preferable, and polyethylene terephthalate is particularly preferably used.

There is no particular limitation on the thickness of the transparent film substrate 1, and the thickness is preferably 10 μm to 400 μm, and more preferably 20 μm to 200 μm. When the thickness is in the above-mentioned range, the transparent film substrate 1 may have durability and moderate flexibility, so that each transparent dielectric layer and transparent electrode layer can be deposited on the transparent film substrate with high productivity by a roll-to-roll method. As the transparent film substrate 1, one in which molecules are oriented by biaxial stretching to improve mechanical properties such as a Young's modulus and heat resistance is preferably used.

Generally, a stretched film is thermally shrinkable when heated because strain resulting from stretching remains in the molecular chain. There has been known a biaxially-stretched film (low-thermal-shrinkage film) in which, in order to reduce the thermal shrinkage, stretching conditions are adjusted and heating after stretching is carried out, whereby, stress is relieved and the thermal shrinkage ratio is reduced to about 0.2% or less, and also the thermal shrinkage initiation temperature is increased. Use of such a low-thermal-shrinkage film as a substrate has been proposed for suppressing failures resulting from thermal shrinkage of the substrate in a process for fabrication of a substrate with transparent electrodes.

A functional layer (not shown) such as a hard coat layer may be formed on one or both surfaces of the transparent film substrate 1. To impart moderate durability and flexibility to the transparent film substrate 1, the thickness of the hard coat layer is preferably 1 to 10 μm, more preferably 3 to 8 μm, and still more preferably 5 to 8 μm. The material of the hard coat layer is not particularly limited, and it is possible to appropriately use a material obtained by applying and curing a urethane-based resin, an acryl-based resin, a silicone-based resin, or the like. To improve adhesion, an easy-to-adhere layer can be laminated on the transparent film substrate 1.

[Thin Film Underlayer 2]

On the transparent film substrate 1, a thin film underlayer 2 is formed. The thin film underlayer 2 is a layer formed for the purpose of prevention of glare, improvement in tint, and adhesion to the film substrate, leading to satisfactory etching properties. Satisfactory etching properties mean that the total of etching times of two layers, for example, a thin film underlayer 2 and a metal oxide layer 3 is 0.05 to 6 times, preferably 0.1 times to 3 times, and more preferably 0.5 to 2 times, longer than that of the metal layer 4.

If the total of etching times of two layers, for example, a thin film underlayer 2 and a metal oxide layer 3 is 0.05 time or less longer than the etching time of the metal layer 4, thin film underlayer 2 is very likely to be etched and side etching of the thin film underlayer 2 is very likely to occur, so that it is difficult to control etching.

Meanwhile, the total of etching times of two layers, for example, a thin film underlayer 2 and a metal oxide layer 3 is 6 times or more longer than the etching time of the metal layer 4, etching of the thin film underlayer 2 requires a long time and the metal layer 4 undergoes side etching, thus failing to perform thinning. The etching rate of the metal layer 4 is 1 to 30 times, preferably 2 to 25 times, more preferably 3 to 20 times, and still more preferably 3 to 15 times, larger than the etching rate of the thin film underlayer 2 and the metal oxide layer 3, whereby, side etching can be suppressed when a thin wire mesh is patterned, thus making it possible to form a thin wire mesh electrode.

The thin film underlayer 2 contains nickel and copper or oxides thereof as a main component. The main component means that nickel and copper or oxides thereof account for 90% or more of the film component. There is an advantage that use of nickel and copper enables etching with a single solution such as an aqueous iron chloride solution, or makes it easy to fabricate layers each having a similar etching rate when using copper as the metal layer 4 or the metal layer 5. The thin film underlayer may contain metal such as silver, tungsten, titanium, or chromium in the content of 10% as the balance.

The thickness of the thin film underlayer 2 is preferably 2 nm or more 20 nm or less, more preferably 3 nm or more 18 nm or less, and still more preferably 4 nm or more 15 nm. If the thickness is too small, the transparent film substrate 1 comes into contact with the metal oxide layer 3 to form a film having a small etching rate, so that the thickness is preferably 2 nm or more. Meanwhile, too thick film is unsuitable in view of prevention of glare because glare occurs.

The deposition method of the thin film underlayer 2 is not particularly limited and is preferably a sputtering method. To improve adhesion between the film substrate 1 and the thin film underlayer 2, a pretreatment such as a plasma treatment may be appropriately performed. Deposition conditions are not controlled by an argon-oxygen ratio, and deposition is preferably performed by the value calculated by oxygen flow rate (sccm)/power density (w/cm$^2$). The etching rate and the degree of glare of the thin film underlayer 2 cannot be controlled only by argon/oxygen, and are preferably controlled by the deposition power and the oxygen amount at that time. The value calculated from the oxygen flow rate (sccm)/power density (w/cm$^2$) is preferably 0 or more and 14 or less. When the value is large, the glare prevention effect is enhanced, but the etching rate drastically decreases and is not suited for thinning, so that the value is not preferably 14 or more.

Regarding distribution of the film in a depth direction, in view of glare and etching properties, it is preferred that the film is close to the transparent film substrate 1, leading to a large ratio of O/(Ni+Cu). Specifically, the "ratio of O/(Ni+Cu) at a position of ½ of a thickness from a surface of the thin film underlayer 2" is preferably smaller than the "ratio of O/(Ni+Cu) at a position of 9/10 of a thickness from a surface of the metal oxide layer 3", more preferably ⅔ or less, and still more preferably ½ or less (see Table 1, FIG. 4).

This is because the glare preventing effect is enhanced while the etching rate decreases, as the value of O/(Ni+Cu) increases. To prevent glare of the side of the film substrate 1, a film portion having a large value of O/(Ni+Cu) is laminated to the side of the film substrate 1, thus making it possible to laminate a film which satisfies both glare preventing effect and etching properties.

Moreover, it is desirable to satisfy the following relationship: a ratio of O/(Ni+Cu) at a position of ½ of a thickness of the thin film underlayer 2 ≤a ratio of O/(Ni+Cu) at a position of ½ of a thickness of the metal oxide layer 3. It is also desirable to satisfy the following relationship: a ratio of O/(Ni+Cu) at a position of 9/10 of a thickness from an interface between the thin film underlayer 2 and the metal oxide layer 3<a ratio of O/(Ni+Cu) at a position of 9/10 of a thickness from a surface of the metal oxide layer 3. (see Table 1, FIG. 4).

[Metal Oxide Layer 3]

On a thin film underlayer 2, a metal oxide layer 3 is formed. The metal oxide layer 3 is a layer for the purpose of prevention of glare and improvement in tint. The metal oxide layer 3 contains oxides of nickel and copper as a main component. The main component means that oxides of nickel and copper account for 90% or more of the film component. The metal oxide layer may contain metal such as silver, tungsten, titanium, or chromium in the content of 10% as the balance. There is an advantage that use of nickel and copper enables etching with a single solution such as an aqueous iron chloride solution, or makes it easy to fabricate layers each having a similar etching rate when using copper as the metal layer 4 or the metal layer 5.

The thickness of the metal oxide layer 3 is preferably 10 nm or more and 80 nm or less, more preferably 11 nm or more and 60 nm or less, and still more preferably 12 nm or more and 40 nm or less. If the thickness is too small, the glare prevention effect and the tint improving effect are not exerted. Meanwhile, too large thickness is not preferable in view of thinning because etching requires a long time. To prevent deterioration of light transmittability, the total of the thickness of the thin film underlayer 2 and the thickness of the metal oxide layer 3 is desirably set at 100 nm or less.

The deposition method of a metal oxide layer 3 is preferably a sputtering method, but is not limited to the sputtering method. Deposition conditions are not controlled by an argon-oxygen ratio, and deposition is preferably performed by the value calculated by oxygen flow rate (sccm)/power density (w/cm$^2$). The degree of glare of the metal oxide layer 3 cannot be controlled only by argon/oxygen, and is preferably controlled by the deposition power and the oxygen amount at that time. The value calculated from the oxygen flow rate (sccm)/power density (w/cm$^2$) is preferably 9 or more and 27 or less. When the value is large, the glare prevention effect is enhanced, but the etching rate drastically decreases and is not suited for thinning, so that the value is not preferably 27 or more.

Regarding distribution of the film in a depth direction, in view of glare and etching properties, it is preferred that the film is close to the transparent film substrate 1, leading to a large ratio of O/(Ni+Cu). Specifically, the "ratio of O/(Ni+Cu) at a position of ¼ of a thickness from a surface of the metal oxide layer 3" is preferably smaller than the "ratio of O/(Ni+Cu) at a position of 9/10 of a thickness from a surface of the metal oxide layer 3", more preferably ⅔ or less, and still more preferably ½ or less (see Table 1, FIG. 4).

This is because the glare preventing effect is enhanced while the etching rate decreases, as the value of O/(Ni+Cu) increases. To prevent glare of the side of the film substrate 1, a film portion having a large value of O/(Ni+Cu) is laminated to the side of the film substrate 1, thus making it possible to laminate a film which satisfies both glare preventing effect and etching properties.

A thin film underlayer 2 containing nickel and copper or oxides thereof as a main component is laminated as a transparent or semitransparent film (20 nm or less) having the glare preventing function, and a metal oxide layer 3 containing oxides of nickel and copper as a main component is laminated thereon as a transparent or semitransparent film (80 nm or less) having the glare preventing function. Whereby, the thin film underlayer 2 and the metal oxide layer 3 enables double suppression of glare of the metal layer 4 (first metal layer). As mentioned above, due to double suppression of glare of the metal layer 4, it is possible to improve etching properties of the thin film underlayer 2 and the metal oxide layer 3 as compared with the case where the thin film underlayer 2 is not formed. As a result, it is possible to simultaneously satisfy an improvement in etching properties and an improvement in glare preventing effect, thus enabling fabrication of those which satisfy both properties which have been in a trade-off relationship.

[Metal Layer 4 (First Metal Layer)]

On a metal oxide layer 3, a metal layer 4 (first metal layer) is formed. The metal layer 4 is a film formed for the purpose of imparting conductivity. The metal layer 4 contains copper, silver, or gold as a main component. The main component means that copper, silver, or gold accounts for 90% or more of the film component. The metal oxide layer may contain other metals or a doping material in the content of 10% as the balance so as to improve properties such as corrosion resistance. The deposition method of the metal layer 4 is no defined, and is preferably an electroless plating, electroplating, or sputtering method, and particularly preferably a sputtering method.

The thickness of the metal layer 4 is preferably 10 nm or more and 500 nm or less, more preferably 50 nm or more and 300 nm or less, and still more preferably 80 nm or more and 200 nm or less. If the thickness is too small, resistance is not sufficiently reduced. Meanwhile, when the thickness is 500 nm or more, too large thickness is not preferable in view of productivity.

[Metal Layer 5 (Second Metal Layer)]

On a metal layer 4, if necessary, a metal layer 5 (second metal layer) is appropriately formed. The metal layer 5 is a film formed for the purpose of reducing resistance by laminating on the metal layer 4. The metal layer 5 contains copper, silver, or gold as a main component. The main component means that copper, silver, or gold accounts for 90% or more of the film component. The metal layer may contain other metals or a doping material in the content of 10% as the balance so as to improve properties such as corrosion resistance. The deposition method of the metal layer 5 is not defined, and is preferably an electroless plating or electroplating method, and particularly preferably an electroplating method.

In the example shown in FIG. 1, a negative pattern of a thin wire mesh electrode is formed on a surface of a substrate Fa with conductive layers using a resist 6, and a metal layer 5 is formed by electroplating. After removing the resist 6, a thin film underlayer 2, a metal oxide layer 3, and a metal layer 4 are etched to fabricate a substrate Fc with touch-panel transparent electrodes. In the example shown in FIG. 2, a thin film-like metal layer 5A is deposited on a surface of the substrate Fa with conductive layers to fabricate a substrate Fb with conductive layers. A positive pattern of a thin wire mesh electrode is formed on a surface of this substrate Fb with conductive layers using a resist 6, and then a thin film underlayer 2, a metal oxide layer 3, a metal layer 4, and a thin film-like metal layer 5A are etched to fabricate a substrate Fc with touch-panel transparent electrodes.

The thickness of the metal layer 5 is preferably 100 nm or more and 10 μm or less, more preferably 200 nm or more and 5,000 nm or less, and still more preferably 500 nm or more and 3,000 nm or less. If the thickness is too small, resistance is not sufficiently reduced. Meanwhile, when the thickness is 10 μm or more, too large thickness is not preferable in view of productivity and thinning. The line width of the metal layer 5 is desirably 1 to 10 μm, and particularly desirably 1 to 5 μm.

[Method for Fabricating Substrate with Conductive Layers]

[Process for Fabricating from Thin Film Underlayer 2 to Metal Layer 4]

FIG. 1 and FIG. 2 are explanatory diagrams showing an example of a method for fabricating a substrate with conductive layers and a substrate with touch-panel transparent electrodes. As shown in FIG. 1(A), although the process for fabricating a thin film underlayer 2 to a metal layer 4 (process for fabricating a substrate Fa with conductive layers) is not limited to the following, a mention is made of an example of depositing by a sputtering method.

Regarding the thin film underlayer 2, a transparent film substrate 1 is disposed in a chamber of a roll-to-roll sputtering device, and a target made of a Ni—Cu alloy is set in the chamber. Then, vacuuming is initiated. After reaching $5\times10^{-4}$ Pa or less, a degassing treatment is performed at a temperature of 50° C., whereby, a gas generated from the film is removed. After sufficiently degassing, an argon-oxygen mixed gas (for example, purity is preferably 99.8% or more) is supplied into the chamber. A ratio of argon:oxygen varies depending on the deposition power density.

A study is made in a range mentioned in the above column [thin film underlayer 2] to determine argon:oxygen. The pressure in the chamber during sputtering has a great influence on uniformity of a blackened layer (thin film underlayer 2), a lamination rate, and the content of oxygen in a (Ni—Cu—O) compound. In the present invention, the pressure is preferably 0.05 Pa or more and 0.6 Pa or less. The pressure is more preferably 0.10 Pa or more and 0.35 Pa or less.

There is no particular limitation on the composition ratio of a Ni—Cu alloy as a target. However, Ni:Cu is preferably 80% by weight to 20% by weight:20% by weight to 80% by weight, and purity is preferably 99.99% by weight or more. By appropriately selecting the composition ratio of a Ni—Cu alloy as a target, the composition ratio of Ni and Cu in the (Ni—Cu—O) compound can be determined. By adjusting the amount of an oxygen gas to be supplied, the content of oxygen in the (Ni—Cu—O) compound can be adjusted. The target is not limited to the Ni—Cu alloy and is Ni—Cu—X where X denote optional one or more elements, and it is possible to use a multi-component material containing Ni and Cu, for example, a ternary alloy, a quaternary alloy, or the like.

Then, without breaking the vacuum, a metal oxide layer 3 is deposited. At this time, continuous deposition is preferably performed in a chamber which is separate from that of the thin film underlayer 2. This is because oxidation of the surface of the thin film underlayer 2 is avoided by breaking the vacuum once.

An argon-oxygen mixed gas (for example, purity is preferably 99.8% or more) is supplied into a chamber. A ratio of argon:oxygen varies depending on the deposition power density. A study is made in a range mentioned in the above column [metal oxide layer 3] to determine argon:oxygen. The pressure in the chamber during sputtering has a great influence on uniformity of a blackened layer (metal oxide layer 3), a lamination rate, and the content of oxygen in a (Ni—Cu—O) compound. In the present embodiment, the pressure is preferably 0.05 Pa or more and 0.6 Pa or less. The pressure is more preferably 0.10 Pa or more and 0.35 Pa or less.

There is no particular limitation on the composition ratio of a Ni—Cu alloy as a target. However, Ni:Cu is preferably 80% by weight to 20% by weight:20% by weight to 80% by weight, and purity is preferably 99.99% by weight or more. By appropriately selecting the composition ratio of a Ni—Cu alloy as a target, the composition ratio of Ni and Cu in the (Ni—Cu—O) compound can be determined. By adjusting the amount of an oxygen gas to be supplied, the content of oxygen in the (Ni—Cu—O) compound can be adjusted. The target is not limited to the Ni—Cu alloy and is Ni—Cu—X where X denote optional one or more elements, and it is possible to use a multi-component material containing Ni and Cu, for example, a ternary alloy, a quaternary alloy, or the like.

Then, without breaking the vacuum, a metal layer 4 is deposited. At this time, continuous deposition is preferably performed in a chamber which is separate from that of metal oxide layer 3. Argon (for example, purity is preferably 99.8% or more) is supplied into a chamber. In the case of continuous deposition, the thickness of copper is adjusted by the deposition power. Purity of Cu as the target is preferably 99.99% by weight or more.

[Method for Fabricating Substrate with Touch-Panel Transparent Electrodes in the case of only Metal Layer 4 (First Metal Layer)]

After passing a thin film underlayer formation step of forming a thin film underlayer 2 on a transparent resin base material such as a transparent film substrate 1, as mentioned above, and a blackened layer formation step of forming a metal oxide layer 3, a metal layer formation step of depositing a metal layer 4 is performed. By performing an electrode formation step (not shown) of forming a thin film underlayer 2, a metal oxide layer 3, and a metal layer 4 into a thin wire mesh electrode on the substrate Fa with conductive layers on which the metal layer 4 was formed after passing the metal layer formation step, a substrate with touch-panel transparent electrode (thin wire pattern) (not shown) is fabricated.

In the metal layer formation step, a resist of an electrode pattern is applied on a surface of the metal layer 4 and then exposed, whereby, a desired pattern of a thin wire mesh to be formed by the resist. Then, a thin film underlayer 2, a metal oxide layer 3, and a metal layer 4 are subjected to an etching treatment. Finally, the resist is removed to fabricate a substrate with touch-panel transparent electrode (thin wire pattern) (not shown) on which thin wire mesh electrodes are formed (subtractive method).

[Method for Fabricating Substrate with Touch-Panel Transparent Electrodes in the case of including Metal Layer 4 (First Metal Layer) and Metal Layer 5 (Second Metal Layer)]

When including a metal layer 4 (first metal layer) and a metal layer 5 (second metal layer), after passing a thin film underlayer formation step of forming a thin film underlayer 2 on a transparent resin base material such as a transparent film substrate 1, as mentioned above, a blackened layer formation step of forming a metal oxide layer 3, a metal layer formation step of depositing a metal layer 4, and a metal layer lamination step of depositing a metal layer 5, an electrode formation step of forming the thin film underlayer 2, the metal oxide layer 3, the metal layer 4, and the metal layer 5 into a thin wire mesh electrode, thus fabricating a substrate Fc with touch-panel transparent electrodes (thin wire pattern). In this case, either a semi-additive method or a subtractive method mentioned below can be employed in the metal layer lamination step and the electrode formation step.

[Semi-Additive Method] (see FIGS. 1(B) to 1(E))

A resist for an electrode pattern is applied on the substrate Fa with conductive layers after deposition of the metal layer 4, and then exposed, thus forming a pattern reverse to a desired pattern to be formed on the metal layer 4 by a resist 6. Then, a metal layer 5 is formed by a plating treatment (metal layer lamination step). After removing the resist, the thin film underlayer 2, the metal oxide layer 3, and the metal layer 4 (electrode formation step) are etched to fabricate a substrate Fc with touch-panel transparent electrodes in which a thin wire mesh electrode having a line width of 1 to 10 μm is formed of the thin film underlayer 2, the metal oxide layer 3, the metal layer 4, and the metal layer 5. There is no particular limitation on the etching solution, and a solution containing an aqueous ferric chloride solution or an aqueous copper chloride solution as a main component is preferably used.

[Subtractive Method] (see FIGS. 2(B) to 2(E))

After forming the metal layer 4, a thin film-like metal layer 5A is deposited to fabricate a substrate Fb with conductive layers (metal layer lamination step). The thin film-like metal layer 5A is deposited by an electroplating method. Electroplating is preferably electroplating using an aqueous copper sulfate solution. Then, a resist for an electrode pattern is applied and exposed, thus forming a desired pattern to be formed on the thin film-like metal layer 5 by a resist 6. Then, a thin film underlayer 2, a metal oxide layer 3, a metal layer 4, and a thin film-like metal layer 5A are subjected to an etching treatment (electrode formation step).

Finally, the resist 6 is removed, thus fabricating a substrate Fc with touch-panel transparent electrodes in which a thin wire mesh electrode having a line width of 1 to 10 μm is formed of a thin film underlayer 2, a metal oxide layer 3, a metal layer 4, and a metal layer 5.

EXAMPLES

Examples of the present invention will be specifically described, but the present invention is not limited to these Examples. In these Examples, mention is made on deposition on one surface so as to clarify properties by the fabrication method according to the present invention, but the process is the same even when formed on both surfaces. The analytical results of Examples 1 to 6, Comparative Examples 1 to 6, and Test Examples 1 to 2 mentioned below are as shown in Table 3.

Figure 3:
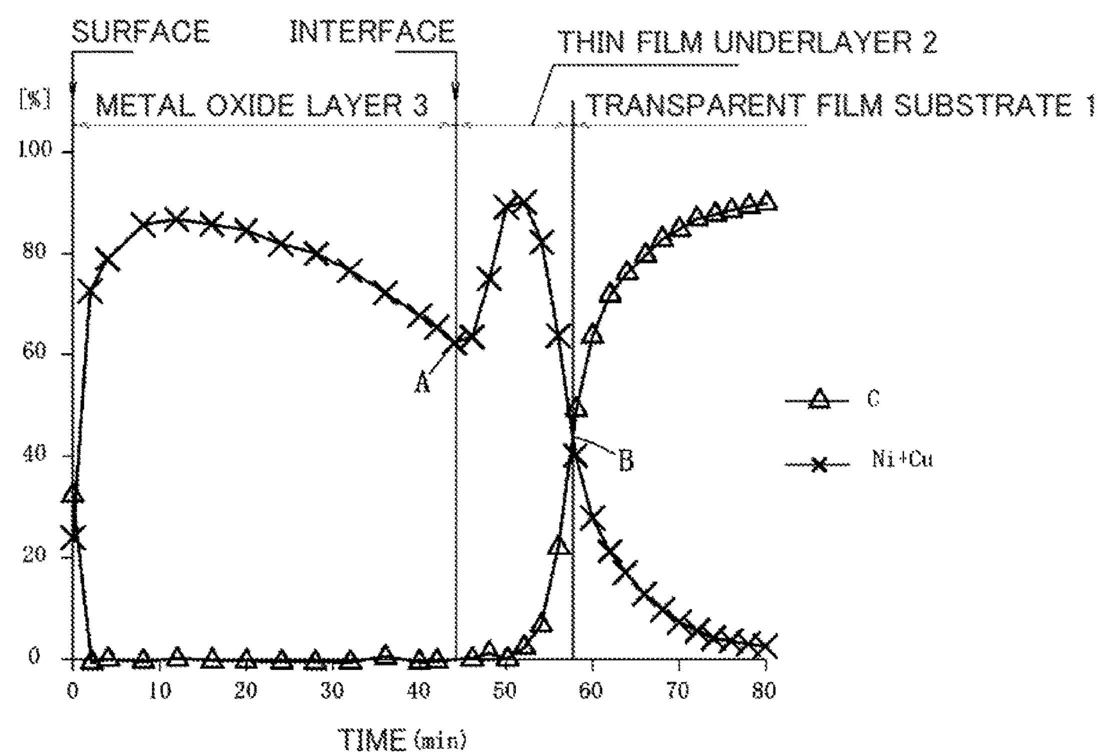
FIG. 3 is a diagram in which a transparent film substrate, a thin film underlayer, and a metal oxide layer are analyzed in Example 1, and the processing time (horizontal axis) of XPS and the contents (%) of "C" and "Ni+Cu" in the main component (vertical axis) are plotted in a graph.
Figure 4:
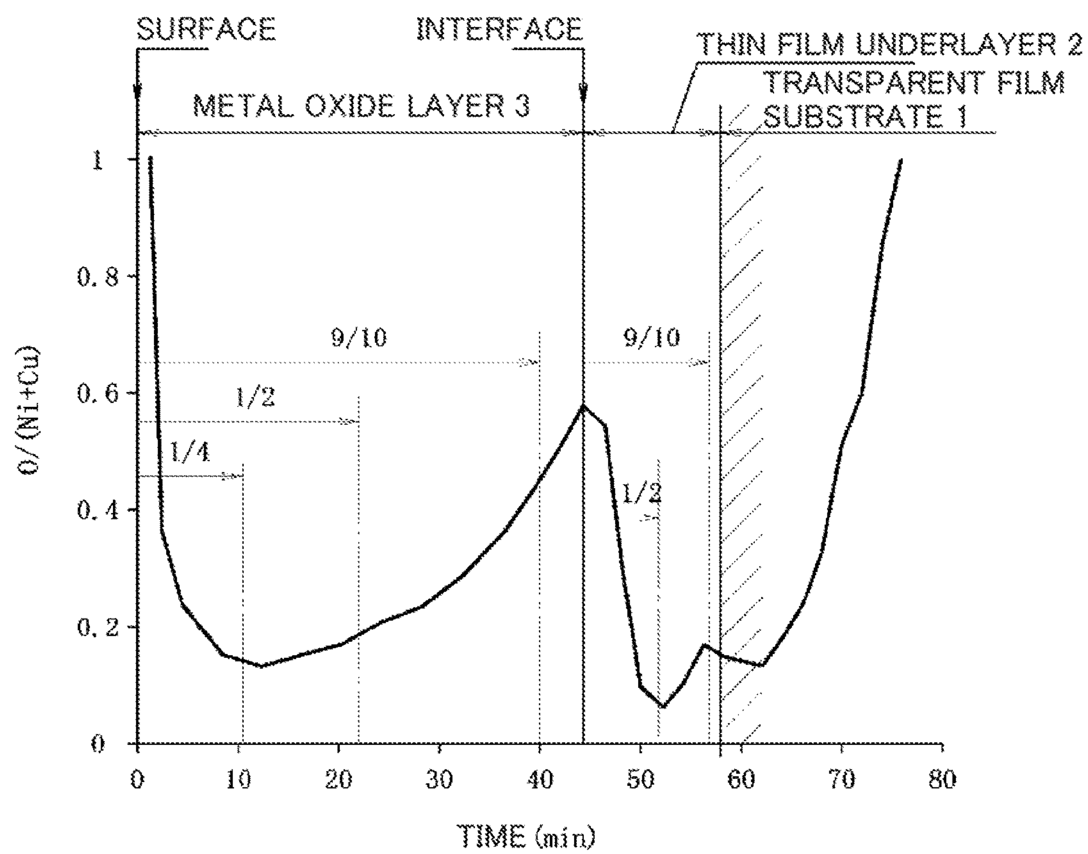
FIG. 4 is a diagram showing the analytical results of O/(Ni+Cu) in the thin film underlayer and the metal oxide layer analyzed in Example 1.

Regarding a ratio of each element, the value determined by depth measurement of XPS is used. Samples used for analysis are samples with the following layer structures: transparent film substrate 1/metal oxide layer 3 and transparent film substrate 1/thin film underlayer 2/metal oxide layer 3. In both samples, analysis from a surface of a metal oxide layer 3 was performed (see FIG. 3, FIG. 4). In FIG. 3, the horizontal axis corresponds to the processing time of XPS, while the vertical axis corresponds to the contents (%) of "C" and "Ni+Cu" in the main component (it is assumed that the main component accounts for 95% or more of the entire component, for example, N, C, O, Ni, and Cu in these Examples). In FIG. 4, the horizontal axis corresponds to the processing time of XPS, while the vertical axis corresponds to the ratio of O/(Ni+Cu). Regarding the value used in analysis, argon sputtering was performed at the same rate and reference was made to the ratio of O/(Ni+Cu) at a position of ½ and a position of 9/10 of a thickness from an interface between the thin film underlayer 2 and the metal oxide layer 3 for the thin film underlayer 2, or reference was made to the ratio of O/(Ni+Cu) at a position of ¼, a position of ½, and a position of 9/10 of a thickness from a surface for the metal oxide layer 3 (see FIG. 4, Table 1).

When transparent film substrate 1/metal oxide layer 3 is analyzed, the thickness of the metal oxide layer 3 was regarded as a distance from "the outermost surface" to "the point at which the number of atoms of carbon (C1s) derived from the transparent film substrate 1 exceeds the total of the number of atoms of nickel (N1s) and copper (Cu2p)". The position in the depth direction was calculated from the time of sputtering of analysis.

When transparent film substrate 1/thin film underlayer 2/metal oxide layer 3 is analyzed, as shown in FIG. 3, the thickness of the thin film underlayer 2 was regarded as a distance from "the point at which the amount of change in a proportion of the total value of the number of atoms of Ni and Cu to the whole turns from minus to plus (point A in FIG. 3)" to "the point at which the number of atoms of carbon (C1s) derived from the transparent film substrate 1 exceeds the total of the number of atoms of nickel (N1s) and copper (Cu2p) (point B in FIG. 3)". The position in the depth direction was calculated from the time of sputtering of analysis. Meanwhile, the thickness of the metal oxide layer 3 was regarded as a distance from "the outermost surface" to "the point at which the amount of change in a proportion of the total value of the number of atoms of Ni and Cu to the whole turns from minus to plus (point A in FIG. 3)". The position in the depth direction was calculated from the time of sputtering of analysis.

Regarding judging criteria of etching properties, the case where the total etching time of a thin film underlayer 2 and metal oxide layer 3 is at most 3 times longer than the etching time of a metal layer 4 (copper is deposited (100 nm) by sputtering) was rated good (A), the case where the total etching time is at most 6 times was rated usable (B)), and the case where the total etching time is at least 6 times was rated unusable (C). To confirm that dissolution residue or deposition causes no damage to a film substrate 1, a transmittance of each sample after etching was appropriately measured by a total light transmittance meter (trade name: NDH7000, manufactured by NIPPON DENSHOKU INDUSTRIES CO., LTD.) and then a comparison was made with a film substrate 1 before deposition, namely, a difference in transmittance.

Glare and tint were judged by measuring color difference of reflection of incident light from the back side of a transparent film substrate 1 using a color difference meter (see Table 3). Glare was judged by L*, and the case where L* is less than 55.0 was rated good (A), the case where L* is 55.0 or more and less than 65.0 was rated usable (B), and the case where L* is 65.0 or more was rated unusable (C).

Tint was judged by and b*, and the case where $|a^*| \leq 2.5$ and $|b^*| \leq 2.5$ was rated good (A), the case where $2.5 < |a^*| \leq 3.0$ and $2.5 < |b^*| \leq 3.0$ was rated usable (B), and the case where $3.0 < |a^*|$ or $3.0 < |b^*|$ was rated unusable (C).

Example 1

As a transparent film substrate 1, a biaxially stretched polyethylene terephthalate (PET) film (50 μm in thickness) including an easy-to-adhere layer formed on a continuous strip-shaped non-colored and transparent surface was prepared. Then, the transparent film substrate 1 is disposed on a roll-to-roll sputtering device and a Ni—Cu (30% by weight) alloy as a target is set in a chamber. After vacuuming to $5\times10^{-4}$ Pa or less, a degassing treatment was performed by raising a temperature of a conveyance drum to 40° C. and conveying a film to remove a gas generated from the film substrate 1.

By adjusting a chamber pressure during conveying of the film substrate to $5\times10^{-4}$ Pa or less, degassing was sufficiently performed. Then, a thin film underlayer 2 made of an alloy containing nickel, copper, and oxygen was deposited on a surface of this PET film by a vacuum magnetron sputtering method. Using a Ni—Cu (30% by weight) alloy target, deposition was performed under deposition conditions of oxygen of 5 sccm, a power density of 0.7 w/cm$^2$, an argon flow rate of 500 sccm, an oxygen flow rate of 5 sccm, a pressure of 0.35 Pa, and a thickness of 6 nm.

Without breaking the vacuum, a metal oxide layer 3 was continuously deposited. Using a Ni—Cu (30% by weight) alloy target, deposition was performed under deposition conditions at an argon flow rate of 500 sccm, an oxygen flow rate of 25 sccm, a pressure of 0.35 Pa, a power density of 1.5 w/cm$^2$, and a thickness of 23 nm. Without breaking the vacuum, a metal layer 4 was continuously deposited. Using a copper target, deposition was performed under deposition conditions of an argon flow rate of 165 sccm, a power density of 1.5 w/cm$^2$, and a thickness of 100 nm. Sheet resistance was 0.4 Ω/□.

After breaking the vacuum, samples were taken out, using a portion thereof, a thin film underlayer 2, a metal oxide layer 3, and a metal layer 4 were etched so as to form a thin wire mesh using an aqueous 2% ferric chloride solution, and then the time was measured. In visual confirmation, the time required to dissolve the thin film underlayer 2 and the metal oxide layer 3 was 2.5 times longer than the time required to dissolve the metal layer 4. A D-line transmittance measured so as to confirm the presence or absence of the dissolution residue of samples after etching was identical (within ±0.4%) to that of the film substrate 1 before deposition. Adhesion measured by cross-cut was 4B or more. The color difference of reflection from the side of the film substrate 1 revealed that glare and tint are satisfactory.

A photosensitive resist was applied on the entire surface of the metal layer 4 (conductor layer) and then dried. Subsequently, using a mask with a mesh pattern reverse to a desired pattern, contact exposure was performed and a developing treatment was performed. Whereby, the metal layer was processed into a pattern in which no resist layer exists only at the portion corresponding to the wiring portion. Then, copper was laminated to an opening in a thickness of 900 nm as a metal layer 5 by electroplating using a solution containing an aqueous copper sulfate solution as a main component (semi-additive method). Then, the resist was removed and etching was performed using an aqueous 2% ferric chloride solution, and the portion except for the thin film underlayer 2, the metal oxide layer 3, and the mesh of the metal layer 4 were removed to fabricate a transparent electrode pattern (thin wire mesh electrode). At this time, a thin wire has a width of 3 μm. The thin wire mesh electrode has an opening ratio of 90% or more and a light transmittance of 91%.

The analytical results of XPS of the thin film underlayer 2 and the metal oxide layer 3 deposited under the conditions of Example 1 are as shown in Table 1 and FIG. 4 below.

TABLE 1

| | Thin film underlayer 2 | | Metal oxide layer 3 | | |
|---|---|---|---|---|---|
| | At position of ½ of thickness from interface of metal oxide layer 3 | At position of 9/10 of thickness from interface of metal oxide layer 3 | At position of ¼ of thickness from surface | At position of ½ of thickness from surface | At position of 9/10 of thickness from surface |
| O/(Ni + Cu) | 0.08 | 0.16 | 0.15 | 0.20 | 0.45 |

Example 2

In the same manner as mentioned above, except that the thickness of the metal oxide layer 3 was reduced to ⅔ in the step of Example 1, a substrate with transparent electrodes was fabricated. In visual confirmation, the time required to dissolve the thin film underlayer 2 and the metal oxide layer 3 was 1.2 times longer than the time required to dissolve the thin film-like metal layer 4. A D-line transmittance measured so as to confirm the presence or absence of the dissolution residue of samples after etching was identical (within ±0.4%) to that of the film substrate 1 before deposition. Adhesion measured by cross-cut was 4B or more.

Example 3

In the same manner as mentioned above, except that the oxygen amount during deposition of the metal oxide layer 3 was changed to the value except for 15 sccm in the step of Example 1, a substrate with transparent electrodes was fabricated. In visual confirmation, the time required to dissolve the thin film underlayer 2 and the metal oxide layer 3 was 2.5 times longer than the time required to dissolve the metal layer 4. A D-line transmittance measured so as to confirm the presence or absence of the dissolution residue of samples after etching was identical (within ±0.4%) to that of the film substrate 1 before deposition. Adhesion measured by cross-cut was 4B or more.

Example 4

In the same manner as mentioned above, except that the oxygen amount during deposition of the metal oxide layer 3 was changed to the value except for 30 sccm in the step of Example 1, a substrate with transparent electrodes was fabricated. In visual confirmation, the time required to dissolve the thin film underlayer 2 and the metal oxide layer 3 was 4.0 times longer than the time required to dissolve the metal layer 4. A D-line transmittance measured so as to confirm the presence or absence of the dissolution residue of samples after etching was identical (within ±0.8%) to that of the film substrate 1 before deposition.

Example 5

In the same manner as mentioned above, except that the oxygen amount during deposition of the thin film underlayer 2 was changed to 0 sccm in the step of Example 1, a substrate with transparent electrodes was fabricated. In visual confirmation, the time required to dissolve the thin film underlayer 2 and the metal oxide layer 3 was 4.0 times longer than the time required to dissolve the metal layer 4. A D-line transmittance measured so as to confirm the presence or absence of the dissolution residue of samples after etching was identical (within ±0.8%) to that of the film substrate 1 before deposition.

Example 6

In the same manner as mentioned above, except that the oxygen amount during deposition of the thin film underlayer 2 was changed to 10 sccm in the step of Example 1, a substrate with transparent electrodes was fabricated. A D-line transmittance measured so as to confirm the presence or absence of the dissolution residue of samples after etching was identical (within ±0.3%) to that of the film substrate 1 before deposition. In visual confirmation, the time required to dissolve the thin film underlayer 2 and the metal oxide layer 3 was 5.0 times longer than the time required to dissolve the metal layer 4.

Comparative Example 1

Under the same conditions as in Example 1, except that the thin film underlayer 2 was not laminated, deposition was performed. The metal oxide layer 3 and the metal layer 4 were etched. As a result, the time required to etch the metal oxide layer 3 was at least 6.0 times longer than the time required to etch the metal layer 4.

Reference Example 1

The analytical results of XPS of the metal oxide layer 3 deposited under the conditions of Comparative Example 1 are as shown in Table 2 below.

TABLE 2

| | Metal oxide layer 3 | |
|---|---|---|
| | At position of 1/4 of thickness from surface | At position of 9/10 of thickness from surface |
| O/(Ni + Cu) | 0.14 | 0.53 |

Comparative Example 2

In the same manner as in Comparative Example 1, except that the metal oxide layer 3 was deposited in the oxygen amount of 10 sccm, the process was performed. The metal oxide layer 3 and the metal layer 4 were etched. As a result, the time required to etch the metal oxide layer 3 was 2.0 times longer than the time required to etch the metal layer 4.

Comparative Example 3

In the same manner as in Example 1, except that the thickness of the metal oxide layer 3 was increased 4 times, the process was performed. The thin film underlayer 2, the metal oxide layer 3, and the metal layer 4 were etched. As a result, the time required to etch the thin film underlayer 2 and the metal oxide layer 3 was at least 6.0 times longer than the time required to etch the metal layer 4.

Comparative Example 4

In the same manner as in Example 1, except that the thickness of the thin film underlayer 2 was increased 5 times, the process was performed. The thin film underlayer 2, the metal oxide layer 3, and the metal layer 4 were etched. As a result, the time required to etch the thin film underlayer 2 and the metal oxide layer 3 was 3.0 times longer than the time required to etch the metal layer 4. However, tint was inferior.

Comparative Example 5

Under the same conditions as in Example 1, except that the thin film underlayer 2 and the metal oxide layer 3 were not laminated, deposition was performed. Tint was inferior.

Test Example 1

In the same manner as in Example 1, except that thin film underlayer 2 was deposited in the oxygen amount of 15 sccm, the process was performed. The thin film underlayer 2, the metal oxide layer 3, and the metal layer 4 were etched. As a result, the time required to etch the thin film underlayer 2 and the metal oxide layer 3 was at least 6.0 times longer than the time required to etch the metal layer 4.

Test Example 2

In the same manner as in Example 1, except that the metal oxide layer 3 was deposited in the oxygen amount of 45 sccm, the process was performed. The thin film underlayer 2, the metal oxide layer 3, and the metal layer 4 were etched. As a result, the time required to etch the thin film underlayer 2 and the metal oxide layer 3 was at least 6.0 times longer than the time required to etch the metal layer 4.

TABLE 3

| | Thin film underlayer 2 | | Metal oxide layer 3 | | | | | | | | |
|---|---|---|---|---|---|---|---|---|---|---|---|
| | Thickness (nm) | Oxygen amount (sccm)/ Deposition power ($W/cm^2$) | Thickness (nm) | Oxygen amount (sccm)/ Deposition power ($W/cm^2$) | Metal layer 4 | Etching properties | Glare | Tint | L* | a* | b* |
| Example 1 | 6 | 7 | 23 | 17 | Copper | A | A | A | 49.9 | −1.7 | 0.2 |
| Example 2 | 6 | 7 | 15 | 17 | Copper | A | A | A | 54.5 | 2.1 | 2.5 |
| Example 3 | 6 | 7 | 23 | 10 | Copper | A | B | A | 60.6 | 0.1 | 2.4 |
| Example 4 | 6 | 7 | 23 | 21 | Copper | B | A | A | 50 | −2 | −1 |
| Example 5 | 6 | 0 | 23 | 17 | Copper | B | B | A | 56 | −0.5 | 0 |
| Example 6 | 6 | 14 | 23 | 17 | Copper | B | A | A | 54.7 | −1.2 | 0.8 |
| Comparative Example 1 | — | — | 23 | 17 | Copper | C | A | A | 49.3 | 0.3 | 0.7 |
| Comparative Example 2 | — | — | 23 | 7 | Copper | A | C | C | 65 | 1.4 | 3.4 |
| Comparative Example 3 | 6 | 7 | 90 | 17 | Copper | C | B | A | 58.6 | 0.9 | 2 |
| Comparative Example 4 | 30 | 7 | 23 | 17 | Copper | B | B | C | 64.5 | 0.1 | 3.5 |
| Comparative Example 5 | — | — | — | — | Copper | A | C | C | 74.1 | 9.8 | 10.1 |
| Test Example 1 | 6 | 20 | 23 | 17 | | C | A | A | 46.5 | −2 | −0.6 |
| Test Example 2 | 6 | 7 | 23 | 31 | | C | A | C | 34.7 | 0.1 | 3.5 |

The value, calculated from oxygen flow rate (sccm)/power density ($w/cm^2$) when the thin film underlayer 2 and the metal oxide layer 3 are laminated by sputtering, of the thin film underlayer 2 is smaller than that of the metal oxide layer 3.

It is possible for those with an ordinary skill in the art to carry out the present invention in the mode in which modifications are made to the above-described mode for carrying out the present invention, and such modified mode is also encompassed in the present invention.

EXPLANATION OF REFERENCE NUMERALS

1 Transparent film substrate
2 Thin film underlayer
3 Metal oxide layer
4 Metal layer (First metal layer)
5 Metal layer (Second metal layer)
5A Thin film-like metal layer 6 Resist Fa, Fb Substrate with conductive layers Fc Substrate with touch-panel transparent electrodes

The invention claimed is:

1. A substrate with conductive layers, comprising, on at least one surface of a transparent film substrate, a thin film underlayer, a metal oxide layer, and a first metal layer formed in this order, wherein the thin film underlayer contains nickel and copper or oxides thereof as a main component, the metal oxide layer contains oxides of nickel and copper as a main component, and the first metal layer contains at least one of gold, silver, and copper as a main component, and wherein the substrate satisfies the following relational expressions (1) to (3):

(1) the thin film underlayer has a thickness of 20 nm or less, (2) the metal oxide layer has a thickness of 80 nm or less, and (3) a thickness of the thin film underlayer≤a thickness of the metal oxide layer.

2. The substrate with conductive layers according to claim 1, which satisfies the following relational expression (4):

(4) a ratio of O/(Ni+Cu) at a position of ½ of a thickness of the thin film underlayer≤a ratio of O/(Ni+Cu) at a position of ½ of a thickness of the metal oxide layer.

3. The substrate with conductive layers according to claim 1, wherein a second metal layer containing any one of gold, silver, and copper as a main component is further laminated on the first metal layer.

4. The substrate with conductive layers according to claim 1, which satisfies the following relational expression (5):

(5) a ratio of O/(Ni+Cu) at a position of ¼ of a thickness from a surface of the metal oxide layer<a ratio of O/(Ni+Cu) at a position of 9/10 of a thickness from a surface of the metal oxide layer.

5. The substrate with conductive layers according to claim 1, which satisfies the following relational expression (6):

(6) a ratio of O/(Ni+Cu) at a position of 9/10 of a thickness from an interface between the thin film underlayer and the metal oxide layer<a ratio of O/(Ni+Cu) at a position of 9/10 of a thickness from a surface of the metal oxide layer.

6. The substrate with conductive layers according to claim 3, wherein the first metal layer has a thickness of 10 nm or more and 500 nm or less and the second metal layer has a thickness of 100 nm or more and 10 µm or less, and wherein the total of the thickness of the thin film underlayer, the thickness of the metal oxide layer, the thickness of the first metal layer, and the thickness of the second metal layer is 10 µm or less.

* * * * *